Aug. 6, 1963 H. W. TREVASKIS 3,100,101
VEHICLE SEAT SUSPENSION MEMBER
Filed July 26, 1960
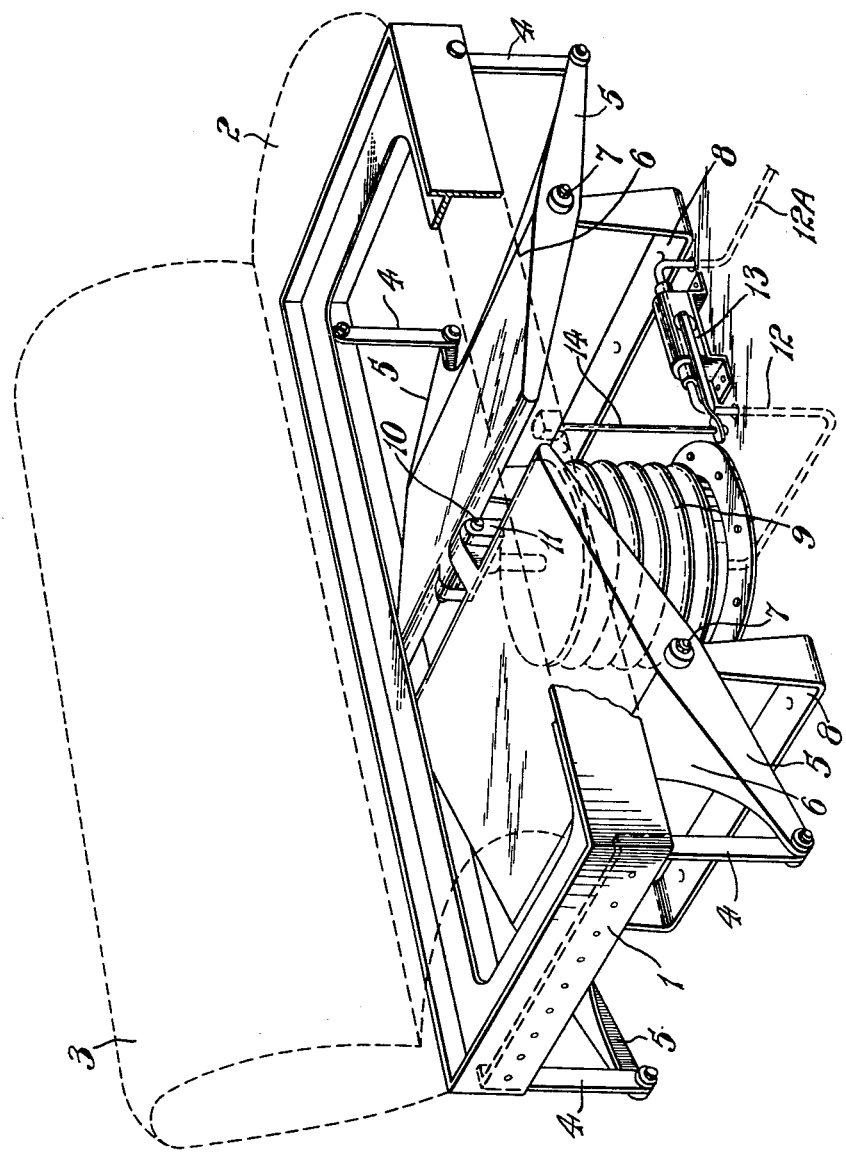
INVENTOR
Henry William Trevaskis
by Benj. T. Rauber
his attorney United States Patent Office 3,100,101
Patented Aug. 6, 1963

3,100,101
VEHICLE SEAT SUSPENSION MEMBER
Henry William Trevaskis, Point Pleasant, Blackdown, near Leamington Spa, England, assignor to Dunlop Rubber Company Limited, a British company
Filed July 26, 1960, Ser. No. 45,360
Claims priority, application Great Britain Aug. 8, 1959
5 Claims. (Cl. 248—399)

Seats currently in use in vehicles are usually mounted on metallic springs, for example, helical coil springs. Alternatively they may be mounted on resilient webbing.

The object of the present invention is to provide an alternative form of suspension and springing means for vehicle seats.

The invention provides the combination, with a vehicle seat, of a supporting and springing unit operable by sub-atmospheric pressure to raise the seat from a floor and a levelling valve responsive to change in level of the seat and effective to control said unit so as to maintain the seat at a predetermined mean level irrespective of variations in the load on the seat. The supporting and springing unit, in association with the levelling valve, also serves to absorb road shocks.

The invention includes, in a vehicle, the combination of a seat, a supporting and springing unit mounted between the seat and the floor of the vehicle and effective, when connected to a source of sub-atmospheric pressure, to raise the seat from the floor and a levelling valve actuable by the seat, when it rises or falls from a predetermined mean level, to control said unit so as to maintain said seat at the predetermined mean level.

Preferably the seat is mounted on a frame and said unit comprises a bellows located beneath the seat frame and connected thereto by a linkage in such manner that evacuation or partial evacuation of the bellows will cause the frame to be raised off the floor of the vehicle. The levelling valve, which may be of the type described in applicant's co-pending application Serial No. 6,132, filed February 2, 1960, now Patent No. 3,044,494, controls the operation of the bellows in such a manner that the seat frame is raised to a predetermined mean level irrespective of loading thereon, that is to say, irrespective of the number or weight of passengers seated thereon.

The source of sub-atmospheric pressure is preferably the inlet side of the engine manifold of the vehicle.

An embodiment of the invention as applied to a bench seat of a passenger carrying vehicle is illustrated in the accompanying drawing.

The seat comprises a rectangular frame 1 supporting a seating squab 2, which may be constituted by a thin layer of foam rubber upholstery, and a shaped back rest 3. Secured to each of the four corners of the rectangular frame 1 is a short leg 4, the lower ends of which rest on the floor of the vehicle when the springing and suspension means is inoperative. The legs 4 are pivoted at these lower ends to levers 5, connected in pairs by cross members 6. The levers 5 are pivoted at points 7 intermediate their ends to brackets 8 secured to the floor of the vehicle.

A bellows 9 is located centrally below the seat frame and fixed at its lower end to the floor of the vehicle. The inner ends of the cross members 6 are coupled by a pivot pin 10 to a forked member 11 projecting upwardly from the top of the bellows 9. The interior of the bellows is connected by a conduit 12, 12A with the inlet side of the engine manifold and interposed in said conduit is a levelling valve 13 of the kind described in the above mentioned application Serial No. 6,132, the valve body being secured to the floor of the vehicle and the operating arm 14 of the valve being connected to the seat frame 1.

With the engine of the vehicle not running the legs 4 of the seat frame rest on the floor of the vehicle. As soon as the engine is started the partial vacuum in the inlet side of the engine manifold partly evacuates the bellows 9 to draw its upper end towards the floor of the vehicle. The cross members 6 are accordingly rocked to raise the seat frame 1 from the floor. When the seat frame has reached a predetermined level the levelling valve 13 cuts off the source of sub-atmospheric pressure from the bellows and maintains the seat frame at that particular height. The levelling valve will maintain this height irrespective of variations in load on the seat arising, for example, from one or more additional pesons sitting on the seat or removing themselves therefrom whilst the engine is running. The levelling valve 13 includes normally closed inlet and exhaust valves. If the seat should rise above the predetermined level, the arm 14 opens the exhaust valve, so causing the bellows 9 to expand and return the seat to the predetermined level, whereupon the exhaust valve closes. If, on the other hand the seat should descend below the predetermined level, the arm 14 opens the inlet valve to apply suction to the interior of the bellows 9. The bellows then contracts and lifts the seat, the inlet valve closing when the seat has returned to the predetermined level. When the engine is stopped the seat will settle down in the mean position if the system is completely leakproof and will continue to support the weight carried by the seat. Otherwise the seat will fall until its legs 4 rest on the floor.

If desired the seat may be supported, when the bellows is not evacuated, by light springs instead of by contact with the floor of legs on the seat frame.

As will be readily understood, more than one bellows may be used to support the seat and a diaphragm, or a piston and cylinder mechanism, actuable by subatmospheric pressure could be substituted for the bellows if desired.

Having now described my invention, what I claim is:

1. A pneumatically supported seat for motor vehicles which comprises a seat element, a supporting element for said seat element comprising a bracket, a variable volume pneumatic member having one end mounted on said supporting element and the opposite end free to move, a lever member pivoted intermediate its ends on said bracket, one end of said lever being connected to the movable end of said pneumatic member and the other end of said lever being connected to said seat element, said pneumatic member being contractible by sub-atmospheric pressure to draw said free end toward said end mounted on said supporting element and to move said seat element away from said supporting element, a control valve mounted on one of said elements to open said valve to a source of sub-atmospheric pressure when said elements move toward each other and to open said valve to atmospheric pressure when said elements move away from each other.

2. A pneumatically supported seat for motor vehicles which comprises a seat element, a supporting element for said seat element having a pair of spaced brackets, a variable volume pneumatic member having one end mounted on said supporting element and the opposite end free to move, a pair of levers each having one end connected to said movable end of said pneumatic member and extending in opposite directions from said pneumatic member and connected at their opposite ends to said seat element, said levers being pivoted intermediate their ends on said brackets, said pneumatic member being contractible by sub-atmospheric pressure to draw said free end towards said fixed end to move said seat element away from said supporting element, a control valve mounted on one of said elements and connected to the other of said elements to open said valve to a source of sub-atmospheric pressure when said elements move toward each other and to open said valve to atmospheric pressure when said elements move away from each other.

3. The apparatus of claim 2 in which the connection of said control valve to said seat element comprises an arm pivoted on said valve and a link connecting said arm to said seat element.

4. The apparatus of claim 2 in which said seat element has front and rear edges and in which each of said levers is connected to said seat element at said front and rear edges.

5. The apparatus of claim 4 in which said seat element has legs, one at each end of said front and rear edges of said seat element and in which said levers are connected to said legs.

References Cited in the file of this patent

UNITED STATES PATENTS

| | | |
|---|---|---|
| 2,572,910 | Brown | Oct. 30, 1951 |
| 2,670,201 | Rossman | Feb. 23, 1954 |
| 2,879,829 | Lavoie | Mar. 31, 1959 |
| 2,880,782 | Conner | Apr. 7, 1959 |
| 2,947,532 | Christensen | Aug. 2, 1960 |
| 2,998,244 | Francis | Aug. 29, 1961 |